(12) United States Patent
Ludwig et al.

(10) Patent No.: US 7,660,798 B1
(45) Date of Patent: Feb. 9, 2010

(54) SYSTEM AND METHOD FOR PROVIDING DOCUMENT SECURITY, ACCESS CONTROL AND AUTOMATIC IDENTIFICATION OF RECIPIENTS

(75) Inventors: Adrian Ludwig, San Francisco, CA (US); Charles E Gotlieb, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 299 days.

(21) Appl. No.: 11/243,838

(22) Filed: Oct. 4, 2005

Related U.S. Application Data

(60) Provisional application No. 60/616,094, filed on Oct. 4, 2004.

(51) Int. Cl.
G06F 17/30 (2006.01)
H04L 29/06 (2006.01)
G06F 15/16 (2006.01)

(52) U.S. Cl. .............................. 707/9; 713/165; 726/11; 726/14

(58) Field of Classification Search .................... 707/9; 713/150, 171, 176, 182, 183, 184, 178, 181
See application file for complete search history.

(56) References Cited

U.S. PATENT DOCUMENTS

| | | | |
|---|---|---|---|
| 5,877,765 A * | 3/1999 | Dickman et al. ............. | 715/738 |
| 6,088,796 A * | 7/2000 | Cianfrocca et al. .......... | 713/152 |
| 6,154,543 A * | 11/2000 | Baltzley ..................... | 380/255 |
| 6,424,718 B1 * | 7/2002 | Holloway ................... | 380/277 |
| 7,082,538 B2 * | 7/2006 | Bouchard et al. ........... | 713/181 |
| 7,117,113 B1 * | 10/2006 | Baekelmans et al. ........ | 702/123 |
| 7,266,847 B2 * | 9/2007 | Pauker et al. ................ | 726/27 |
| 7,434,048 B1 | 10/2008 | Shapiro et al. | |
| 7,571,321 B2 * | 8/2009 | Appenzeller et al. ........ | 713/171 |
| 2002/0078361 A1 * | 6/2002 | Giroux et al. ............... | 713/183 |
| 2002/0126850 A1 * | 9/2002 | Allen et al. .................. | 380/277 |
| 2004/0010712 A1 * | 1/2004 | Hui et al. ..................... | 713/201 |
| 2004/0039706 A1 * | 2/2004 | Skowron et al. .............. | 705/51 |
| 2004/0139228 A1 * | 7/2004 | Takeda et al. ................ | 709/245 |
| 2004/0187022 A1 * | 9/2004 | Asada et al. ................. | 713/200 |
| 2005/0055552 A1 * | 3/2005 | Shigeeda ..................... | 713/171 |
| 2005/0086196 A1 * | 4/2005 | Peterson ......................... | 707/1 |
| 2005/0091499 A1 * | 4/2005 | Forlenza et al. ............. | 713/176 |
| 2005/0097061 A1 * | 5/2005 | Shapiro et al. ................ | 705/67 |
| 2005/0114266 A1 * | 5/2005 | Satkunanathan et al. ...... | 705/59 |
| 2005/0166263 A1 * | 7/2005 | Nanopoulos et al. ........... | 726/7 |

OTHER PUBLICATIONS

Rosenberg et al., RFC: 3489—Simple Traversal of User Datagram Protocol (UDP) Through Network Address Translators (NATs), Mar. 2003, The Internet Society.*

Adobe Systems, Inc., Adobe Acrobat 5.0 Engineering How To Guide, 2002, pp. 49-54.*

Adobe Systems, Inc., Digital Signature Appearances, May 2003, Adobe Systems, Inc., pp. 1-20.*

(Continued)

*Primary Examiner*—Vincent Boccio
*Assistant Examiner*—Huen Wong
(74) *Attorney, Agent, or Firm*—Fish & Richardson P.C.

(57) ABSTRACT

A system and method attempts to access a portable electronic document using different methods depending on whether the user attempting access is in front of, or behind, a firewall.

18 Claims, 6 Drawing Sheets

OTHER PUBLICATIONS

Mississippi State University, Adobe Acrobat 5.0, 2002, Mississippi State University, pp. 28-47.*

Adobe Systems, Inc., Acrobate Digital Signature Overview Technical Note #5400, Adobe Systems, Inc., pp. 1-16.*

Atkins et al., Request for Comments 1991 (PGP), Aug. 1996, Internet Engineering Task Force.*

Adobe Systems, Inc., Acrobat Digital Signature Overview Technical Note #5400, Apr. 2, 2001, Adobe Systems, Inc., pp. 1-16 (submitted as NPL document with Office Action on Aug. 19, 2008).*

* cited by examiner

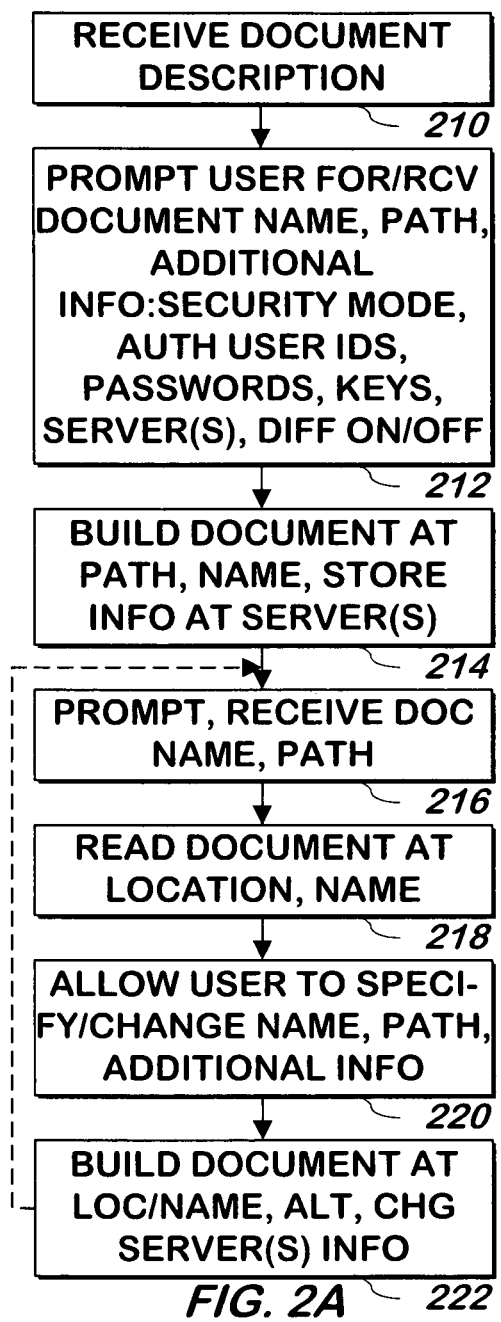
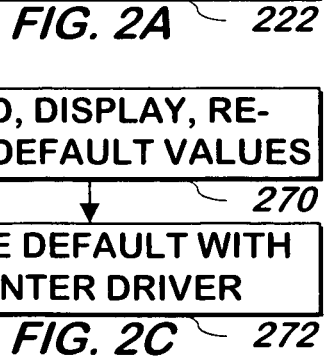
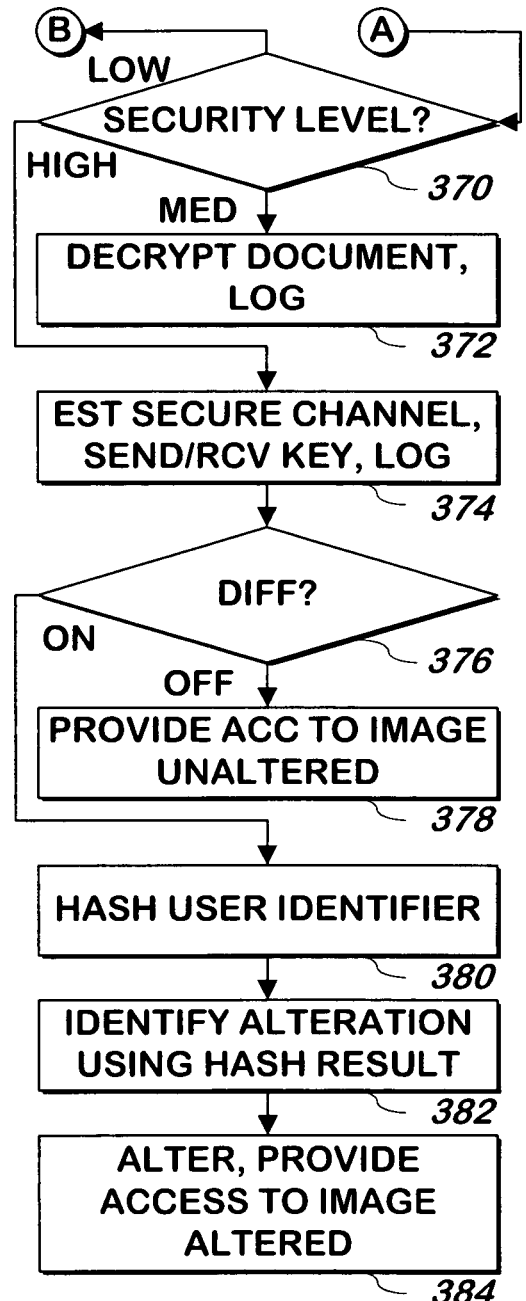

SYSTEM AND METHOD FOR PROVIDING DOCUMENT SECURITY, ACCESS CONTROL AND AUTOMATIC IDENTIFICATION OF RECIPIENTS

RELATED APPLICATION

This application claims the benefit of application Ser. No. 60/616,094 entitled, "Method and Apparatus for Security of a Portable Document" filed on Oct. 4, 2004 by Adrian Ludwig and Charles Gotlieb, having the same assignee as this application and is incorporated herein by reference in its entirety.

FIELD OF THE INVENTION

The present invention is related to document publishing systems and more specifically to document security for document publishing systems.

BACKGROUND OF THE INVENTION

Many parties publish portable electronic documents, such as Flash Paper documents or Adobe Acrobat documents using tools such as Flash Paper commercially available from Macromedia, Inc., of San Francisco, Calif., or the conventional Acrobat product commercially available from Adobe Systems, Inc., of San Jose, Calif. However, the security features of such products have been limited to restricting the opening of documents to users who have a password. A user who may use many documents from different sources thus may not only have to enter the password for each document, but the user will have to remember many passwords. This manner of protecting documents is cumbersome for the recipients of the documents. An author of a portable electronic document who wishes to limit access to the document is thus forced to choose between: not restricting access only to authorized users, but making the access procedure for authorized users easier for them, or restricting access, but making the access procedure for authorized users more cumbersome.

Users are used to being able to access documents anywhere, which may have been one of the reasons that the existing system of password protection has become prevalent. It would be desirable if any solution to the problem described above allowed a document to be used anywhere. Security solutions that would require a user to be in a certain location to view a document would not allow users elsewhere to access the document, frustrating users and making the solution to the above problems seem like it was a step backwards.

Although access to a portable electronic document can be restricted until an authorized user opens the document, an authorized user can make the document available to one or more unauthorized users, for example, by printing the document and then providing it to any number of unauthorized users. Although the document, once provided in this manner, is no longer secure, it can be desirable to identify the authorized user who made the document available to the one or more unauthorized users, in order to protect the security of other documents that can then be withheld from that user.

What is needed is a system and method that can protect the security of a portable electronic document without requiring all the users of the document to remember a password, that allows access to the document from various locations, and can identify a party that breaches the security of a portable electronic document.

SUMMARY OF INVENTION

A system and method allows information to be embedded into a portable electronic document, either at the time the document is created, or at a later time, that can be used to grant access to the portable electronic document in the least-cumbersome manner possible for the user at the time. Users behind a firewall may use one procedure to obtain access to the document, and users outside the firewall may use a different procedure to obtain access to the document. The information may be user identifiers and passwords as well as encryption keys, though some of this information may be stored on one or more servers instead of being stored in the document or in addition to it. If the user is indicated as being able to access the document, the reader grants access to the document, for example to view or print it, and otherwise the reader does not grant access to the document. Access to the document may be enforced by the program that operates as the document reader either connecting to a server that is only available behind a firewall and determining that the document should be opened merely because the server is accessible, or the portable electronic document may be encrypted, and access to the document may be enforced by a key encrypted in the document or provided by the server. In or out of the firewall, access to the document may be provided using encryption keys or user names or passwords, and an optional logging server may be contacted to log the access. Either server can log successful and failed access attempts, and notification of such attempts may be provided to the author or any other destination, for example, via e-mail.

The system and method can cause the document to appear differently when different users access the document. Such different appearance can be generated by the reader when the document is rendered. The document reader uses the identifier of the user and other information to render the document slightly or significantly differently for each user, so that the source of unauthorized copies may be identified.

BRIEF DESCRIPTION OF THE DRAWINGS

FIG. 2A is a flowchart illustrating a method of making a portable electronic document according to one embodiment of the present invention.

FIG. 2C is a flowchart illustrating a method of storing default values associated with a printer driver used for building a portable electronic document file according to one embodiment of the present invention.

DETAILED DESCRIPTION OF A PREFERRED EMBODIMENT

Figure 1:
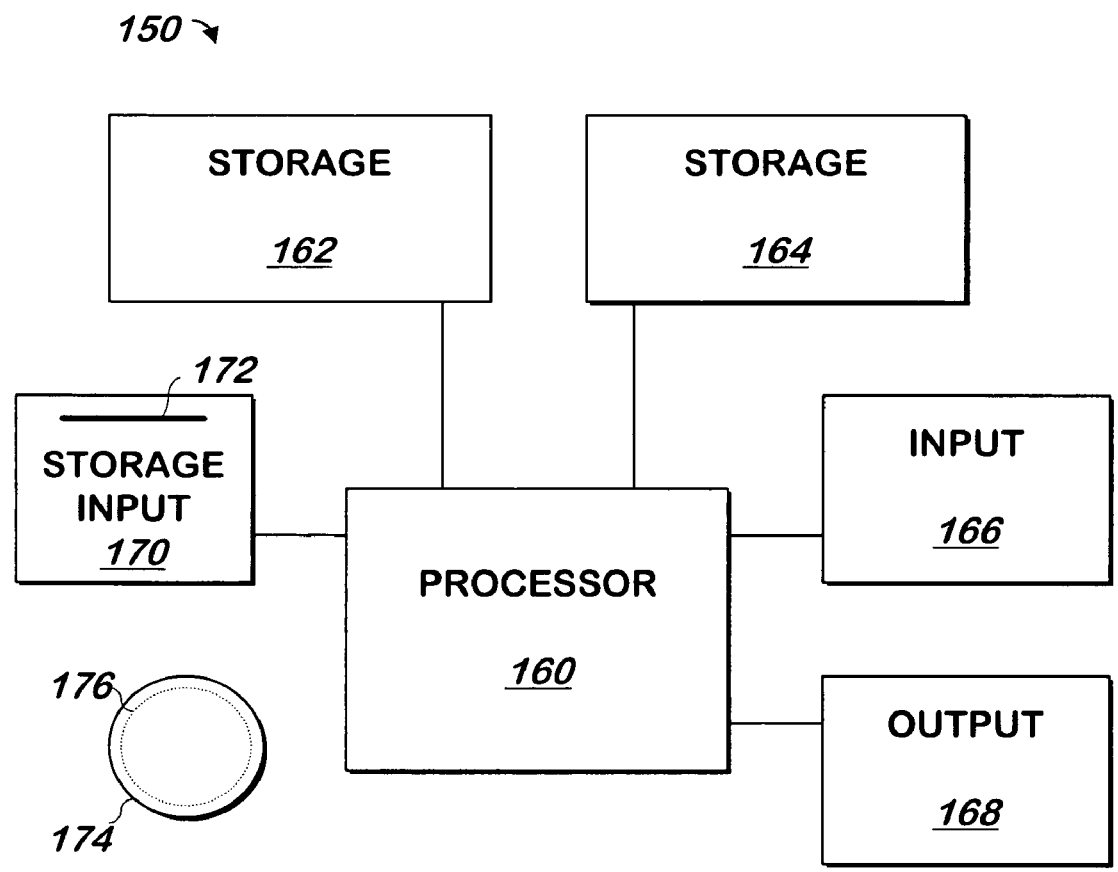
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Referring now to FIG. 2A, a method of building a portable electronic document is shown according to one embodiment of the present invention. A document description is received 210. The document description may be received from an operating system, for example, via a printer description language that is provided in response to a user printing a document to a printer driver that produces portable electronic documents instead of, or in addition to, actually printing the document.

The user is prompted for a document name and path to be used to store the portable electronic document, and the user may be prompted for additional information related to the security of the portable electronic document and such information is received 212. The additional information may include a security mode that describes the type of security under which the document will be stored (and may be specified as multiple modes instead of a single mode), user identifiers of users authorized to view the document, public keys (or identifiers that can be used to obtain the public keys) of such users who may view the document with or without connecting to a server, and one or more user identifiers/and or passwords that can be used to view the document either with or without connecting to a server. In one embodiment, the additional information includes the URL or IP address of any of the servers described herein, and a designation of whether a server is behind the firewall as described herein (with the Internet being not behind the firewall). Such servers may include a server behind the firewall that will provide the key or decrypt the document, one or more authentication servers that can authenticate the user, for example using conventional web services, or a password entered by the user, and a server outside the firewall that can log access to the document.

In one embodiment, the security modes may include: "no security" to allow access to the portable electronic document to anyone who possesses it; several behind the firewall modes that allow access either to anyone behind the firewall or to specified users behind the firewall; several outside the firewall modes including access requiring a private key corresponding to one of the public keys received as additional information, or a password or secret key that does not require access to a server; access notification including none, logged access records or e-mail notification of access; and the level of security: low, meaning the image in the portable electronic document is not encrypted, medium, meaning the image information in the portable electronic document is encrypted, with access enforced by the reader, and high, meaning the image information in the portable electronic document is encrypted, but access is enforced by a server. In one embodiment, a differentiated view security mode may be on or off, indicating that the document should be rendered differently for different users.

The additional information is optional in one embodiment, and in such embodiment, the additional information need not be provided. If such additional information is not supplied, default values for such information may be implied. For example, a default security option may include "no security" or "allow access to anyone behind the firewall, but not otherwise". In one embodiment, a configuration step is used to store such default information associated with the printer driver so that such information can be used as the default if not otherwise specified.

Referring momentarily to FIG. 2C, a method of specifying default values for the additional information is shown according to one embodiment of the present invention. Default values are read and displayed, and any new values are received 270 for the additional information, and such default values are stored 272 associated with the printer driver or authoring tool that will be used to create and store the portable electronic document.

Figure 2B:
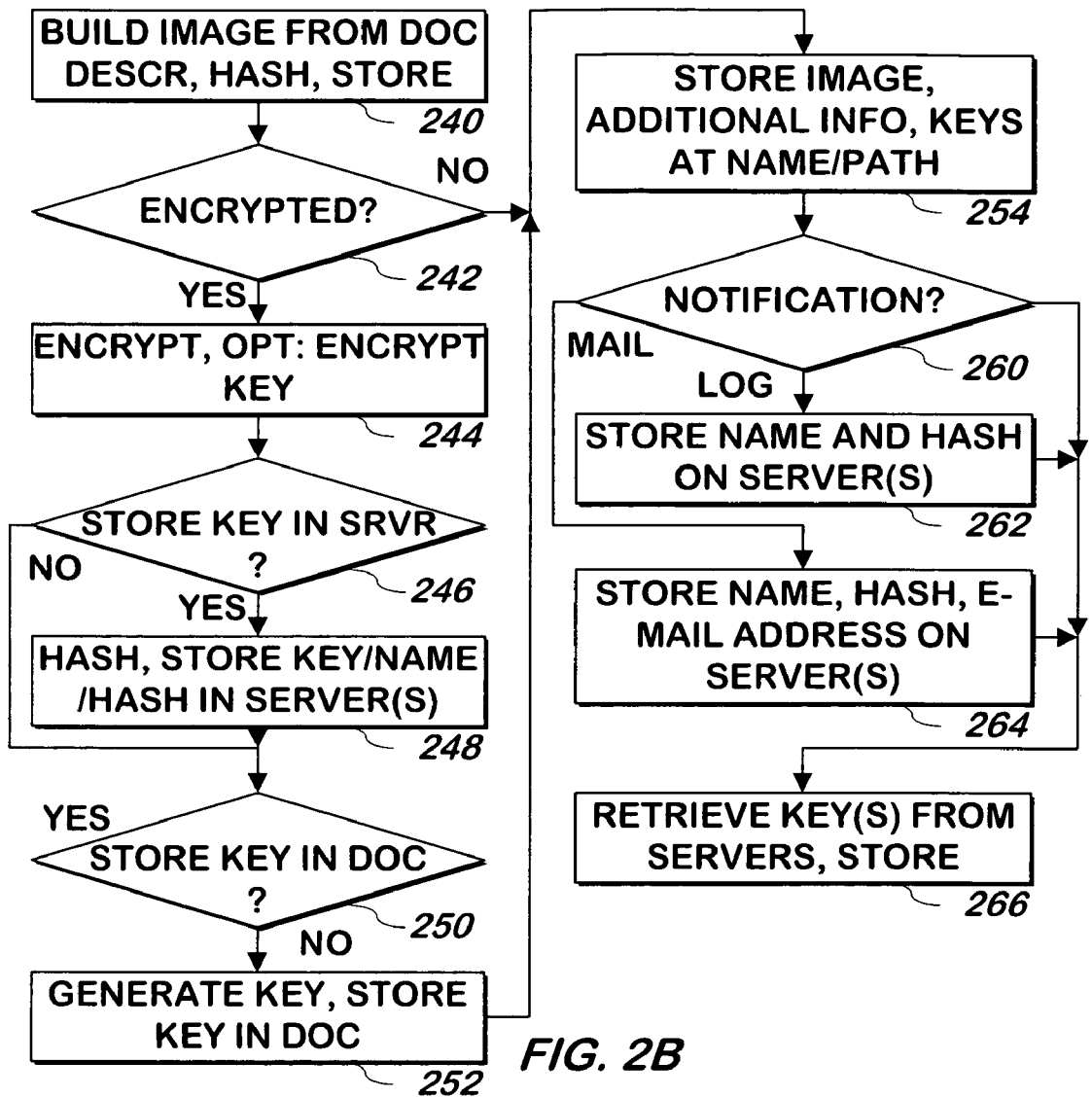
FIG. 2B is a flowchart illustrating a method of building a portable electronic document file according to one embodiment of the present invention.

Referring again to FIG. 2A, the file containing the image of the portable electronic document, as well as some or all of the additional information is built 214 as described in FIG. 2B and stored at the path and name specified. At this point, the file (i.e. the document) is built and the document may be accessed as described in FIG. 3. However, the author may elect to change the additional information, optionally provide a new name or path, and build and store the portable electronic document file. In such case, the method may continue at step 216. At step 216, the user is prompted for the name and path of the portable electronic document built as described above, and the name and path is received. The portable electronic document file specified is opened and read 218. The user is prompted to specify or change the name, path or additional information and such name, path or additional information is received 220. The portable electronic document file is built and stored at the last-received name and path according to any additional information specified 222. The author may elect to use the document as specified or change it again at step 216.

Referring now to FIG. 2B, a method of building a portable document file is shown according to one embodiment of the present invention. The steps of FIG. 2B may be among those used to build the file in steps 214 or 222 of FIG. 2A.

An image of the document is generated and stored 240 using the information from the page description received in step 210. The image need not be an actual image: it need only provide sufficient information to a reader to allow the reader to produce an image that corresponds to the page description information received in step 210. In one embodiment, step 240 includes hashing the image and storing the hash result for storage into the file.

If the document security mode requires the document to be encrypted 242, the image is encrypted 244 using a secret key, for example using triple DES, and the method continues at step 246, and otherwise 242, the method continues at step 252. The secret key may be generated by a the printer driver or authoring tool or may be supplied by the server behind the firewall upon request.

At step 246, if the key is to be stored at the server, the name, hash result and encryption key are stored in the appropriate server or servers 248 associated with one another and the method continues at step 250 and otherwise 246, the method continues at step 250. The address of the servers used herein are specified with the additional information as described above. For example, the key would be stored in the server behind the firewall if access to the document is available to specified users or all users behind the firewall and the security level is set to high.

At step 250, if the key is to be stored in the document, the key is encrypted using a key or keys that will be known to the reader and the encrypted key is stored 252 in the file. For example, if the portable electronic document is to be encrypted, but accessible for specific users with a username and password, the key may be generated by hashing the encrypted image information to generate a hash result, and then using the hash result as a key to hash the key used to encrypt the image, and this hashed key is stored in the file.

The additional information such as modes, passwords and the like and image, encrypted if security is other than low, and any keys to be stored in the file, are stored in the file representing the portable electronic document 254. Passwords and other sensitive information stored in the document may be encrypted.

If the access notification includes access logging 260, the name and hash result of the document are stored on the servers used to log access 262. If access notification includes e-mail notification 260, the name, hash result of the document and e-mail address are stored on the server or servers used to log and e-mail access 264. If users are to access the document using their private key or a username and/or password as authentication, such users public keys may be obtained and stored in the document or on the server or servers used to access the document 266.

The above actions may be performed by an author using an authoring tool or printer driver. The portable electronic document file can then be e-mailed or otherwise made available to a user and either the author or the users may then access the document, for example to read it or to print it. To access the document, a portable electronic document reader is used, such as the Adobe Acrobat Reader commercially available from Adobe Corporation of San Jose, Calif., or the Flash Player plug in to popular browsers such as Internet Explorer described above. The authoring tool may also be used to access the portable electronic document, however, the description below describes the access being performed by the player. The exact same actions may be performed by the authoring tool, however.

Figure 3A:
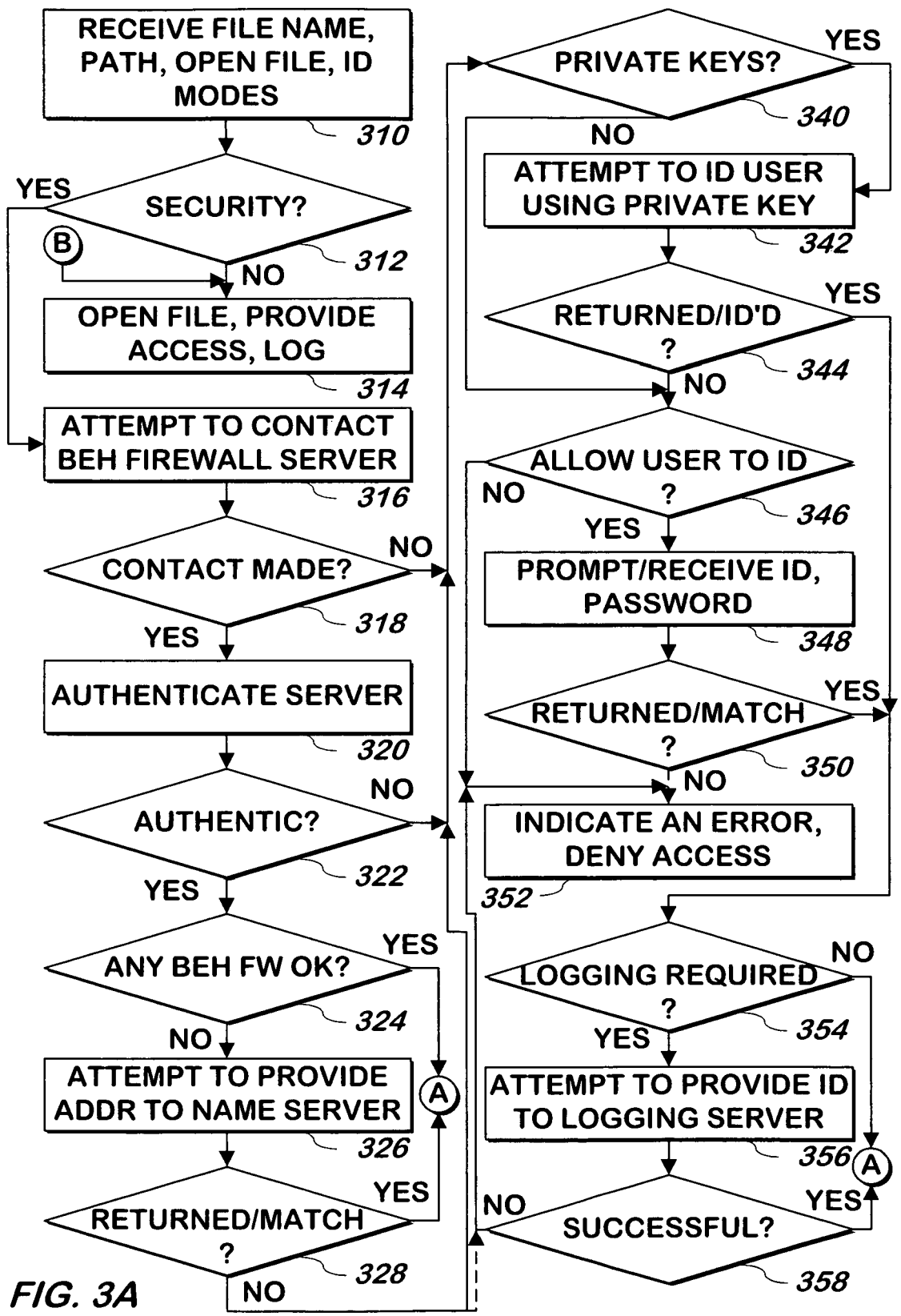
FIG. 3, consisting of FIGS. 3A and 3B, is a flowchart illustrating a method of providing or denying access to a portable electronic document according to one embodiment of the present invention.

FIG. 3, consisting of FIGS. 3A and 3B, is a flowchart illustrating a method of providing or denying access to a portable electronic document according to one embodiment of the present invention. Referring now to FIG. 3A, the name and path of the file containing the portable electronic document is received (or the user can specify the name and path), and the file is opened and the security mode or modes are identified 310. If the security mode or modes indicate no security 312, access to the portable electronic document is provided 314, for example by reading the image information in the file and rendering it either to a display screen or to a printer, for example, by placing a page description of the image information into a page description language used by the operating system. The page description language may be the same one described above. Although no logging need be performed in this mode, in one embodiment, if a logging server is specified in the file, a message is sent to the server containing the name and hash result of the image. The server obtains from a system clock the current date and time and logs the date and time of access if access notification was set to logged access or e-mail access. In the latter case, the server will receive the message and retrieves the e-mail address of the author associated with the name and hash result received in the message, and sends a notification to that address with the date and time of access. In another embodiment, the e-mail address is stored in the portable electronic document file and send with the message for the server to use to send the e-mail message.

If the "no security" mode does not apply to this document 312, an attempt is made to contact the server that sits behind the firewall specified in the document 316. If contact with the server is made, the server may be authenticated 318 using any conventional authentication technique. For example, a challenge phrase may be sent to the server encrypted using the public key for the server stored in the document. The server has the private key and can decrypt the challenge phrase and return it in cleartext If the challenge phrase matches the one encrypted and sent to the server, the server is authenticated, although other conventional means of authenticating the server may be used. If contact with the server behind the firewall is not made 318, the method continues at step 340.

If the server is determined to be authentic 322, if the security mode indicates that any user behind the firewall may read the document 324, the method continues at step 370 of FIG. 3B and otherwise 322 the method continues at step 340.

If the security mode indicates that access is only to be granted to specified users behind the firewall 324, an attempt is made to identify the user, one embodiment of which will now be described, though any conventional method of identifying the user may be employed. In one embodiment, the MAC address or IP address of the user's computer system is obtained and an attempt is made to provide such address to a web services server (which may be authenticated in a similar manner as described above, or the server may be the same as the server described above, in which case no further authentication is needed or messages, as well as the name and hash of the document, may be provided to such server, which has at this point already been authenticated, and that server can communicate with the web services server to obtain the user identifier and return it to the reader in response) that can match a user identifier to such an address 326. If the web services server returns a user identifier and the user identifier matches one of the authorized user identifiers in the document 328, the method continues at step 370 of FIG. 3B. If the web services server cannot be contacted or does not return a match 328, in one embodiment, the method continues at step 352 as indicated by the dashed line in the Figure, and in another embodiment, the method continues at step 340. The server or web services server may log, or e-mail notification of, the date and time of access and the filename and the username of the user accessing the portable electronic document. If necessary, the username, filename and hash is provided to the server as part of step 328.

If the "yes" branch of steps 324 or 328 are taken, the user will have been cleared to view the document without any password or even a private key. This means that users can view portable documents behind a firewall with a minimum of effort. As described below, users may, if the security allows, view the document outside the firewall, but in that case, unless no security is designated, the user will supply a private key or password in order to view the document. This means that users outside the firewall may still be allowed to access the portable electronic document, but they are required to provide more effort or infrastructure in identifying themselves.

At step 340, if the security mode allows the user to be identified using a private key and one or more public keys were stored in the document, an attempt is made to identify the user, for example using the challenge response system described above, encrypting a random phrase using all public keys stored with the document, and identifying 342 which one, if any, returns the challenge phrase using a private key associated with the reader performing step 342. If a match is found 344, the method continues at step 354. Otherwise 344, the method continues at step 346.

If the security mode allows the user to authenticate using a user identifier and optionally, a password 346, the user is prompted the user identifier and optionally, a password, and such items may be received 348. If the user responds with a user identifier and optionally a password that matches one of those stored in the document 350, the method continues at step 354 and otherwise, the method continues at step 352. If the security mode does not allow the user to supply a user identifier and password 346, or the user does not supply a proper one 350, the user is notified that an error had occurred and denied access to the image of the portable electronic document 352. In one embodiment, step 316 follows step 352.

At step 354, if logging is not required, the method continues at step 370 of FIG. 3B, and otherwise 354 an attempt is made to provide the user identifier to a logging server outside the firewall 356, and if the attempt is successful 358, the method continues at step 370 of FIG. 3B, and otherwise, the method continues at step 352.

At step 370 of FIG. 3B, if the security level is low, the method continues at step 314. If the security level is medium 370, the image is decrypted, and any logging server is notified of the access as described above if the access has not already been logged via another server 372. If the security level is high 370, the server that has the key provides the key, the image is decrypted, and a logging server is notified if logging has not already been performed 374. The server logging the access behind the firewall, which may be the same server behind the firewall described above, is notified of the name and hash of the document (and optionally the e-mail address) via the messaging process described above, and can log the access or notify the author or any other parties designated by the author.

If the additional information indicates that the document is not to be displayed differently to different users 376, the user is provided access to the image unaltered 378. If the additional information indicates that the document is to be displayed differently to different users 376, an identification of how the image should be changed is made. In one embodiment, the server provides the difference when the user identifier is provided to it, if the additional information indicates that the document is to be displayed differently to different users. In another embodiment illustrated in the FIG. 3B, the document reader determines the difference. In this embodiment, the reader hashes the information used to identify the user, such as the user identifier and the hash of the document 380. If the user identifier is not known to the reader as described above, one of the servers may provide it. The reader uses the hash result to identify one of several possible alteration manners 382, alters the image information in the identified manner, and then provides access to the image modified in the fashion identified 384. The author can input the user identifier to the authoring tool and view a description of how the document was altered (e.g. added a quarter space before word 174 and removed a quarter space following word 174).

Although certain additional information is described as being stored in the document, in other embodiments, that information is stored in one or more of the servers described above. For example, if security is high, the encryption key used to decrypt the document may be stored at the server instead of storing it with the file and provided by the server to the reader under a secure communications channel, such as IPSec or SSL if the user is identified and optionally authenticated as described above. Certain actions may be performed by the reader or the server or servers. For example, the public keys of authorized users may be stored in the server or servers instead of the document, and the challenge response sequence may be performed by the server encrypting and sending the challenge phrase, receiving the response, determining whether a match has occurred, and if so, providing the key for decrypting the document to the reader. Similarly, the authoring tool provides the additional information to the file or the server or servers as may accomplish the desired action.

Figure 4:
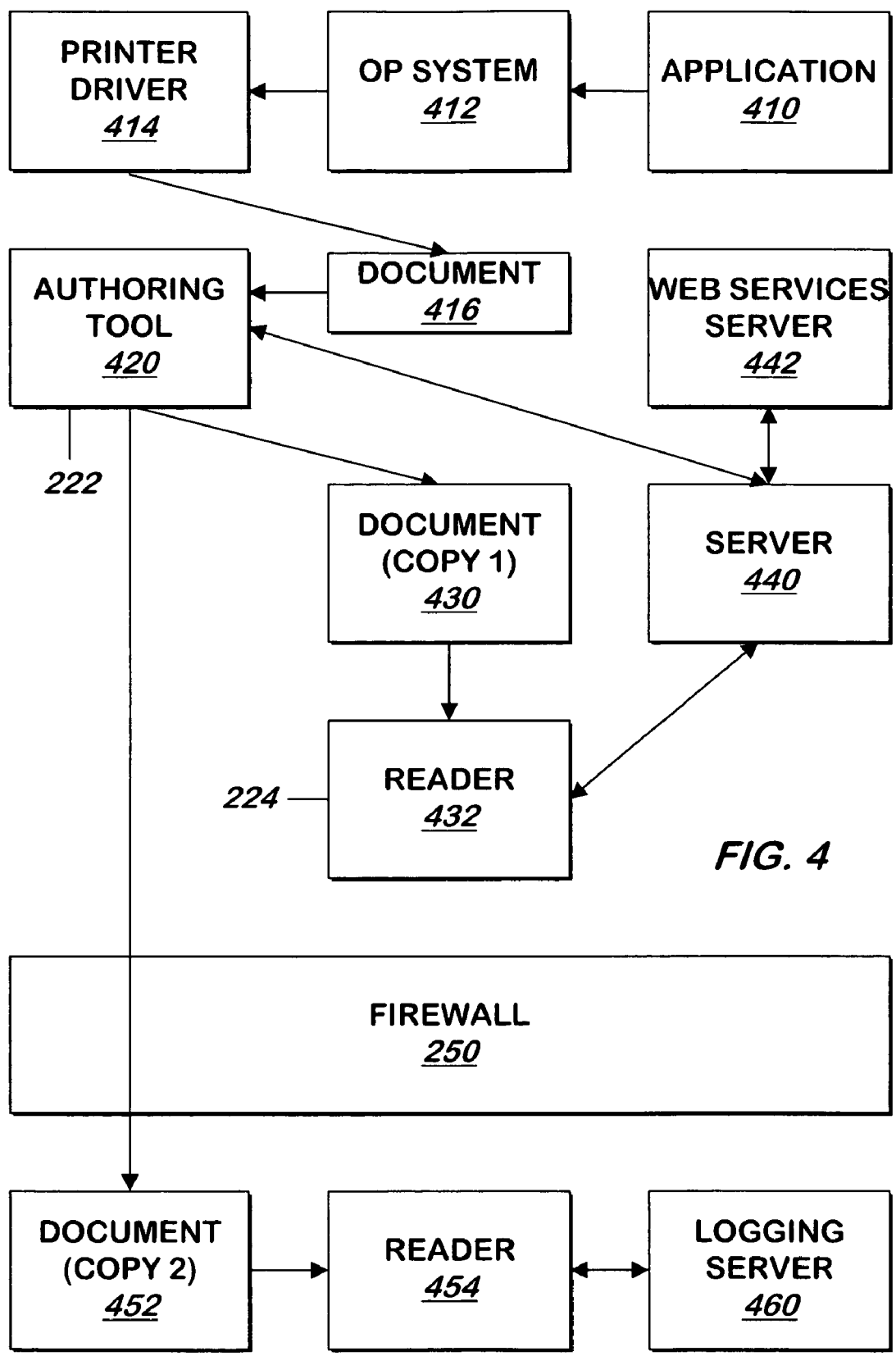
FIG. 4 is a block schematic diagram illustrating a system for authoring and providing or denying access to a portable electronic document according to one embodiment of the present invention.

Referring now to FIG. 4 a representative system for providing access to various copies of a portable electronic document is shown according to one embodiment of the present invention. An author uses an application 410 such a Word for Windows, Visio, (both commercially available from Microsoft Corporation) or any other conventional application to print via a conventional operating system 412 to a printer driver 414, which interprets the printing language and produces a portable electronic document file 416, after prompting the user for the name and path at which to store the file and any additional information described above that the author of the document file 416 wishes to supply. An authoring tool 420 can read the document 416 receive changes to the additional information or edits to the image itself, and save it, either into its original location or, as shown in the figure, as a separate version. One or more copies 430, 452 of the saved version of the document can be distributed to users via an e-mail program (not shown). When a reader 432 behind the firewall opens the document, it will attempt to connect to server 440 having an address which is specified in the reader or in the document. If the connection is made, based on the security mode or modes, the reader will either provide access to the image in the document, or verify the user identifier of its owner either directly via web services server 442 or via server 440 and if the user is authorized, the reader will provide access to the image in the document. When the reader provides access to the document, it may also alter the document as described above if the modes so indicate. Server 440 may log the access, including the date, time and user identifier, and optionally send an e-mail message to the author or any other party or parties, such e-mail address or addresses having been provided to the server by the authoring tool 420, printer driver 414 or reader 432. As part of the process above, reader 432 will provide the file name and hash of the image, stored in the document file 430 by authoring tool 420 or printer driver 414.

Outside the conventional firewall, reader 454 reads copy 2 of the document 452 (the documents 430, 452 need not be identical copies, but may be identical) and also tries to contact server 440, but is blocked by firewall 250. Based on the security modes in the document, reader 454 will attempt to use the user's private key associated with the reader 454 as described above or prompt the user for a user identifier and/or password. If the user so identifies himself and the user is authorized, if the document mode requires it, reader 454 will attempt to contact logging server 460 and provide the user identifier or other means of identifying the user and the logging server 460 will log the access, e-mail or both, in a manner similar to that described above. The e-mail address may be received from reader 454, authoring tool 420 or printer driver 414. If the attempt is successful, reader 454 will provide access to the image in the document 452, altering it if the security mode so indicates as described above. As noted, the documents can be provided without any security, or the encryption keys required to open the documents may be stored on one or both of server 440 and logging server 460, and associated with the document name and hash. Each server 440, 460 will provide the key if the user properly authenticates himself as described above. When readers 432, 454 contact servers 440 or 460, they provide the name and hash of the document 430, 452 to identify the document being accessed. Servers will provide the log upon request of the author, and access to such logs may be password or otherwise controlled. Firewall 250 is a conventional firewall and servers 440, 454 are conventional servers performing the functions described herein. Web services server 442 is a conventional server that operates as described herein.

Figure 5:
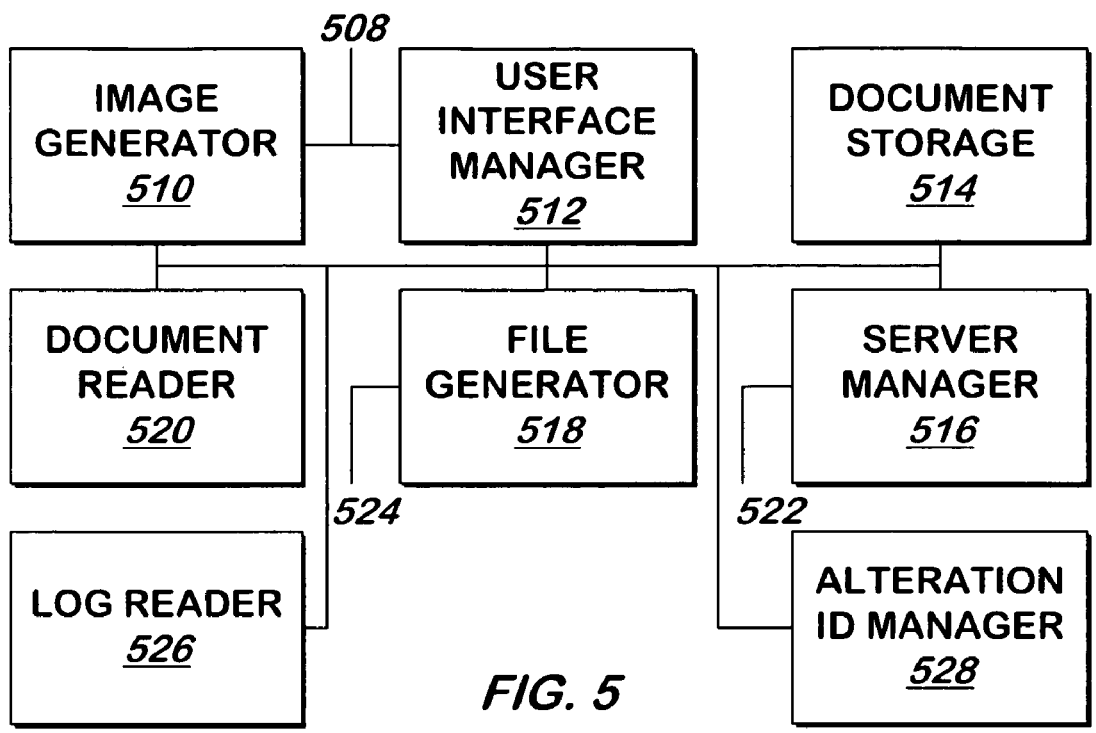

FIG. 5 is a block schematic diagram of a representative printer driver or authoring tool according to one embodiment of the present invention. The printer driver or authoring tool may operate like any conventional printer driver or authoring tool such as those described above.

Image generator 510 receives the printer description language information from the operating system via input/output 508 and generates the information used to create the image, such as a page description language or a frame of an animation and stores it into document storage 514. User interface manager 512 prompts the user for the file name and path and the additional information and stores some or all of the additional information into document storage 514. If the image is to be encrypted, user interface manager 512 provides a key to image generator 510, which encrypts the image and stores the encrypted image into document storage 514. User interface manager 512 signals server manager 516 with any key that is to be stored at the server, and server manager 516 hashes the document, stores the result into document storage 514 and provides to one or more of the servers specified or defaulted via input/output 522 the file name, hash and any or all of the encryption key and usernames and or passwords and or public keys or identifiers of public keys corresponding to the authorized users. User interface manager 512 signals file generator 518, which builds the image and some or all of the additional information and any or all of the encryption key (which it encrypts as described above), public keys or identifiers thereof of authorized users, (some or all of which it may encrypt) into a file in a format that can be read by the readers that will read the file, via input/output 524. In the case of the authoring tool, document reader 520 reads a file specified by an author.

The authoring tool also has log reader 526 that can be used to retrieve the logs from the server. In one embodiment, the logs are password protected by the server, the password having been provided as additional information by the user to user interface manager 512, stored at the server or servers and associated with the name and hash of the document via server manager 516. Log reader 526 prompts the user for, receives and provides the password from the user to the server or servers and if the password matches, the server or servers return the logs.

The authoring tool also has alteration identification manager 528, which retrieves the hash of the document and the name of an authorized user to identify the manner in which the document is altered as described above. Alteration identification manager 528 then provides the author with an explanation of the alteration for that user as described above. This capability may also be password protected.

Figure 6:
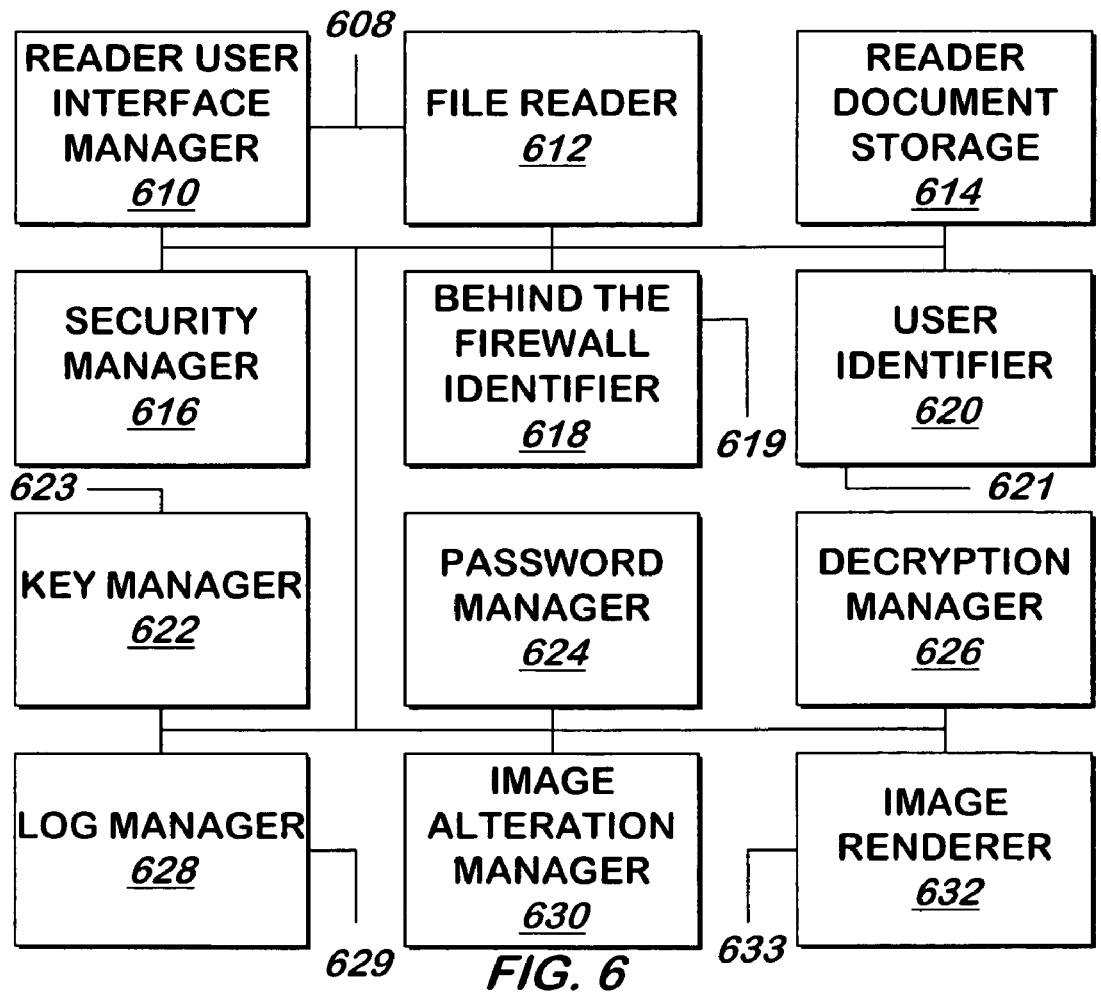

Referring now to FIG. 6, a block schematic diagram of a reader is shown according to one embodiment of the present invention. Reader user interface manager 610 allows a user to specify a name and path of the file, and reader user interface manager 610 provides the name and path to file reader 612, which reads the portable electronic document file stored at the name and path and stores the file into an internal data structure in reader document storage 614. File reader 612 then signals security manager 616, which if the "no security" mode is specified, signals image alteration manager 630, which alters the image as described above if one of the modes in reader document storage 614 so indicates, and provides it to image renderer 632, which renders the image and provides it via input/output 633. Otherwise, security manager 616 retrieves from reader document storage 614 and provides to behind the firewall identifier 618, the address of a server behind the firewall. Behind the firewall identifier 618 attempts to contact the server via input/output 619 by providing the name and hash of the file and optionally the e-mail address or addresses specified by the author. If the contact is successful, behind the firewall identifier 618 signals security manager 616. The server can log the access or send an e-mail as described above.

Security manager 616 determines if the security mode that allows anyone behind the firewall to access the portable electronic document, and if so, signals image alteration manager 630, which operates in conjunction with image renderer 632 as described above. If only certain users are authorized behind the firewall, security manager 616 signals user identifier, which identifies the user (e.g. via a MAC address or IP address of the user) to the server or a separately specified name server and receives the user identifier of the user that the user used to log into the network, via input/output 621. User identifier provides the user identifier it receives to security manager 616, which compares it to the list of authorized users stored in reader document storage 614. If the user identifier matches that of an authorized user stored in reader document storage 614, security manager signals image alteration manager 630, which operates in conjunction with image renderer 632 as described above. If the user identifier is not on the list, in one embodiment, security manager 616 indicates the error to reader user interface manager 610, which indicates the error to the user, and access to the image of the portable electronic document is thereby denied. In another embodiment, security manager instead, continues as described below.

If the server behind the firewall cannot be contacted or the user cannot be identified or authorized, security manager 616 signals key manager 622, which participates via input/output 623 in a challenge response arrangement either with the server or by itself using a private key associated with it and internally stored therein. If the user is thus authenticated as an authorized user, key manager 622 signals security manager 616. If the security mode or modes indicate logging is not required, security manager 616 signals image alteration manager 630, which operates in conjunction with image renderer 632 to provide access to the document. If logging is required, security manager 616 provides the user identifier to log manager 628, which attempts to contact via input/output 629 the logging server having the address stored in reader document storage 614. If successful, it provides the user identifier it receives, and the name and hash of the document, and optionally the e-mail address or addresses specified by the author, to the logging server (not shown) via a network coupled to log manager 628. If successful, it signals security manager 616, which signals image alteration manager 630, which operates in conjunction with image renderer 632 to provide access to the image of the portable electronic document.

If key manager 622 cannot authenticate the user because, for example, it cannot locate a corresponding key, it signals security manager 616, which then signals password manager 624. Password manager 624 identifies whether any user identifiers and/or passwords are stored in reader document storage 614 corresponding to authorized users. If so, password manager 624 signals reader user interface manager 610, which prompts the user for his user identifier and/or password and provides them to password manager 624. Password manager 624 either compares them against the usernames and/or passwords of authorized users stored in reader document storage 614 or provides them and the name and hash of the document and optionally the e-mail address via secure communications channel to the logging server which indicates whether a match has occurred with the authorized usernames and password and logs the access. If either such match occurs, password manager 624 signals security manager 616, which signals log manager if so indicated by the mode or modes and if the password manager 624 did the comparison of the usernames and/or passwords, and otherwise signals image alteration manager 630, which operates as described above in conjunction with image renderer 632 to provide access to the image of the portable electronic document. If no match occurs, security manager 616 signals reader user interface manager 610, which indicates that access to the portable electronic document image is denied and such access is, in fact denied.

The description above in which image alteration manager 630 is signaled by security manager 616 is the case if security is set to low, which security manager 616 checks in reader document storage 614 before signaling image alteration manager 630. If security is set to medium or high, security manager will first signal decryption manager 626, which decrypts the encrypted image in reader document storage either using the key stored in reader document storage 614 or received via a secure channel from one of the servers by user identifier 620, key manager 622, password manager 624 or decryption manager 626 in response to a successful authentication of the user and provided to security manager 616, which provides it to decryption manager 626.

In one embodiment, the servers are accessed via a network: the behind the firewall sever via a local area network and the logging server via a network such as the Internet. The firewall sits between the network such as the Internet and the local area network. The readers can connect either to the network or the local area network. Connection to the network may be made via a virtual private network, in which case access is considered to be made from behind the firewall.

In one embodiment, access to portions of a document may be granted or denied based on whether the user is in front of or behind the firewall, allowing access to sensitive information in the document only if the access is made from behind the firewall. Other portions of the document are accessible from either in front of, or behind, the firewall.

What is claimed is:

1. A computer-implemented method of accessing a secured portable electronic document, the method comprising:
    using a verification server for granting access to a secured portable electronic document;
    retrieving additional information corresponding to the secured portable electronic document, from the secured portable electronic document, in response to a request to access the secured portable electronic document, wherein:
        the additional information includes an address corresponding to the verification server,
        the additional information includes a designation of whether the verification server is behind a firewall, and
        the additional information specifies a security mode selected from a group comprising (i) behind the firewall and (ii) outside the firewall;
    granting access to the secured portable electronic document based at least in part on validation information stored on the verification server identified by the address in the additional information when the verification server is accessible, wherein:
        the validation information stored on the verification server includes a private key corresponding to a public key included in the additional information from the secured portable electronic document, and
        the granting access to the secured portable electronic document based at least in part on the validation information stored on the verification server comprises allowing access only to specified users behind the firewall, when the security mode is behind the firewall; and
    granting access to the secured portable electronic document based at least in part on validation information associated with a user submitting the access request when the verification server is not accessible, wherein:
        the validation information associated with the user includes one or more of a user identifier and a password that are embedded in the secured portable electronic document, and
        the granting access to the secured portable electronic document based at least in part on validation information associated with a user comprises allowing access to users upon verification of validation information associated with the user, when the security mode is outside the firewall.

2. The computer-implemented method of claim 1, further comprising:
    displaying the secured portable electronic document.

3. The computer-implemented method of claim 2, wherein displaying further comprising:
    differentially displaying the secured portable electronic document based on an identifier associated with the user.

4. The computer-implemented method of claim 1, wherein the validation information associated with the user includes a private key.

5. The computer-implemented method of claim 1, further comprising:
  logging the access to the secured portable electronic document, including recording one or more of an access time, an access date, and a user identifier corresponding to the user.

6. A computer program product, encoded on a computer-readable medium, operable to cause data processing apparatus to perform operations comprising:
  using a verification server for granting access to a secured portable electronic document;
  retrieving additional information corresponding to the secured portable electronic document, from the secured portable electronic document, in response to a request to access the secured portable electronic document, wherein:
    the additional information includes an address corresponding to the verification server,
    the additional information includes a designation of whether the verification server is behind a firewall, and
    the additional information specifies a security mode selected from a group comprising (i) behind the firewall and (ii) outside the firewall;
  granting access to the secured portable electronic document based at least in part on validation information stored on the verification server identified by the address in the additional information when the verification server is accessible, wherein:
    the validation information stored on the verification server includes a private key corresponding to a public key included in the additional information from the secured portable electronic document, and
    the granting access to the secured portable electronic document based at least in part on the validation information stored on the verification server comprises allowing access only to specified users behind the firewall, when the security mode is behind the firewall; and
  granting access to the secured portable electronic document based at least in part on validation information associated with a user submitting the access request when the verification server is not accessible, wherein:
    the validation information associated with the user includes one or more of a user identifier and a password that are embedded in the secured portable electronic document, and
    the granting access to the secured portable electronic document based at least in part on validation information associated with a user comprises allowing access to users upon verification of validation information associated with the user, when the security mode is outside the firewall.

7. The computer program product of claim 6, further operable to cause data processing apparatus to perform operations comprising:
  displaying the secured portable electronic document.

8. The computer program product of claim 7, further operable to cause data processing apparatus to perform operations comprising:
  differentially displaying the secured portable electronic document based on an identifier associated with the user.

9. The computer program product of claim 6, wherein the validation information associated with the user includes a private key.

10. The computer program product of claim 6, further operable to cause data processing apparatus to perform operations comprising:
  logging the access to the secured portable electronic document, including recording one or more of an access time, an access date, and a user identifier corresponding to the user.

11. A system comprising:
  a secured portable electronic document stored on a computer-readable medium; and
  a computing system including processor electronics configured to perform operations comprising:
    using a verification server for granting access to the secured portable electronic document;
    retrieving additional information corresponding to the secured portable electronic document, from the secured portable electronic document, in response to a request to access the secured portable electronic document, wherein:
      the additional information includes an address corresponding to the verification server,
      the additional information includes a designation of whether the verification server is behind a firewall, and
      the additional information specifies a security mode selected from a group comprising (i) behind the firewall and (ii) outside the firewall;
    granting access to the secured portable electronic document based at least in part on validation information stored on the verification server identified by the address in the additional information when the verification server is accessible, wherein:
      the validation information stored on the verification server includes a private key corresponding to a public key included in the additional information from the secured portable electronic document, and
      the granting access to the secured portable electronic document based at least in part on the validation information stored on the verification server comprises allowing access only to specified users behind the firewall, when the security mode is behind the firewall; and
    granting access to the secured portable electronic document based at least in part on validation information associated with a user submitting the access request when the verification server is not accessible, wherein:
      the validation information associated with the user includes one or more of a user identifier and a password that are embedded in the secured portable electronic document, and
      the granting access to the secured portable electronic document based at least in part on validation information associated with a user comprises allowing access to users upon verification of validation information associated with the user, when the security mode is outside the firewall.

12. The system of claim 11, wherein the processor electronics are further configured to perform operations comprising:
  displaying the secured portable electronic document on a display included in the computing system.

13. The system of claim 12, wherein the processor electronics are further configured to perform operations comprising:
   differentially displaying the secured portable electronic document based on an identifier associated with the user.

14. The system of claim 11, wherein the validation information associated with the user includes a private key.

15. The system of claim 11, wherein the processor electronics are further configured to perform operations comprising:
   transmitting to a log server a request to log the access to the secured portable electronic document, wherein the logging request includes one or more of an access time, an access date, and a user identifier corresponding to the user.

16. The computer-implemented method of claim 2, wherein the displaying is based on a level of security specified in the additional information, the method further comprising:
   not encrypting an image in the secured portable electronic document, when the level of security is low;
   encrypting an image in the secured portable electronic document, with access enforced by the user, when the level of security is medium; and
   encrypting an image in the secured portable electronic document, with access enforced by the verification server, when the level of security is high.

17. The computer program product of claim 7, wherein the displaying is based on a level of security specified in the additional information, the product further operable to cause data processing apparatus to perform operations comprising:
   not encrypting an image in the secured portable electronic document, when the level of security is low;
   encrypting an image in the secured portable electronic document, with access enforced by the user, when the level of security is medium; and
   encrypting an image in the secured portable electronic document, with access enforced by the verification server, when the level of security is high.

18. The system of claim 12, wherein the displaying is based on a level of security specified in the additional information, and wherein the processor electronics are further configured to perform operations comprising:
   not encrypting an image in the secured portable electronic document, when the level of security is low;
   encrypting an image in the secured portable electronic document, with access enforced by the user, when the level of security is medium; and
   encrypting an image in the secured portable electronic document, with access enforced by the verification server, when the level of security is high.

* * * * *